United States Patent
Kawakami

(10) Patent No.: US 7,861,265 B2
(45) Date of Patent: Dec. 28, 2010

(54) ELECTRONIC APPARATUS HAVING BROADCAST RECEIVING FUNCTION AND METHOD FOR DISPLAYING ELECTRONIC PROGRAM GUIDE THEREIN

(75) Inventor: Kazuhisa Kawakami, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1011 days.

(21) Appl. No.: 11/005,876

(22) Filed: Dec. 7, 2004

(65) Prior Publication Data

US 2005/0166237 A1    Jul. 28, 2005

(30) Foreign Application Priority Data

Dec. 9, 2003 (JP) .............. 2003-410453

(51) Int. Cl.
H04N 5/445 (2006.01)
H04N 7/173 (2006.01)

(52) U.S. Cl. .............. 725/40; 725/50; 725/51; 709/802

(58) Field of Classification Search .............. 725/37–61
See application file for complete search history.

(56) References Cited

U.S. PATENT DOCUMENTS

| | | | |
|---|---|---|---|
| 5,589,892 A | 12/1996 | Knee et al. | |
| 6,536,041 B1* | 3/2003 | Knudson et al. | 725/39 |
| 6,757,691 B1 | 6/2004 | Welsh et al. | |
| 7,073,188 B2* | 7/2006 | Lemmons et al. | 725/47 |
| 2001/0039656 A1* | 11/2001 | Nakamura et al. | 725/9 |
| 2002/0100049 A1* | 7/2002 | Yamato et al. | 725/47 |
| 2003/0115602 A1 | 6/2003 | Knee et al. | |
| 2003/0149988 A1* | 8/2003 | Ellis et al. | 725/87 |
| 2003/0172382 A1* | 9/2003 | Kim | 725/53 |
| 2004/0010799 A1* | 1/2004 | Jang | 725/58 |
| 2004/0031063 A1 | 2/2004 | Satoda | |
| 2004/0117831 A1* | 6/2004 | Ellis et al. | 725/53 |
| 2004/0123316 A1* | 6/2004 | Kendall et al. | 725/37 |
| 2004/0158860 A1* | 8/2004 | Crow | 725/46 |
| 2005/0022237 A1* | 1/2005 | Nomura | 725/39 |
| 2005/0086689 A1* | 4/2005 | Dudkiewicz et al. | 725/40 |
| 2005/0235322 A1* | 10/2005 | Ellis et al. | 725/58 |

FOREIGN PATENT DOCUMENTS

| | | |
|---|---|---|
| JP | 3228754 | 9/2001 |
| JP | 2001-290396 | 10/2001 |

(Continued)

OTHER PUBLICATIONS

Office Action dated May 19, 2008 issued by Japanese Patent Office in related JP Patent Application No. 2003-410453 (including English translation).

*Primary Examiner*—Andrew Y Koenig
*Assistant Examiner*—Carmine Malangone
(74) *Attorney, Agent, or Firm*—Brinks Hofer Gilson & Lione

(57) ABSTRACT

A digital broadcast receiver includes a memory for obtaining and storing electronic program guide information about programs to be broadcast and progress information showing the progress of an program which is being broadcast in each channel, a display device such as a television screen, and a controller for allowing the display device to display the electronic program guide together with the progress information corresponding to the electronic program guide information by reading the progress information from the memory.

22 Claims, 5 Drawing Sheets

FOREIGN PATENT DOCUMENTS

| | | |
|---|---|---|
| JP | 2001-518901 | 6/2002 |
| JP | 2002-185943 | 6/2002 |
| JP | 2003-203035 | 7/2003 |
| WO | WO 99/65244 | 12/1999 |
| WO | WO 00/33576 | 6/2000 |

* cited by examiner

FIG. 5

| | NHK main | FTV | FCT | TUF | |
|---|---|---|---|---|---|
| 20:00 | NHK News<br>▽ Today in Japan and the World<br>▽ Background of news<br><br>about North Korea | J-league<br>Kashima Antlers ×<br>Jubilo Iwata<br>in Kashima Stadium<br><br>25 min. of 2nd half<br>Kashima 3 - 1 Iwata<br>Kashima's corner kick<br>Kicker: Ogasawara | Professional Baseball<br>Giants × Tigers<br>in Tokyo Dome<br><br>bottom of<br>6th inning<br>Giants 4 - 7 Tigers<br>Pitcher: Yabu<br>Batter: Kiyohara<br>1 strike and 3 balls | USO? Japan<br><br>Encounter with alien<br>Tackey is surprised | } 50<br><br>} 60 |

FIG. 6

| | NHK main | FTV | FCT | TUF | |
|---|---|---|---|---|---|
| 20:00 | NHK News<br>▽ Today in Japan and the World<br>▽ Background of news<br><br>about North Korea<br>(8:14) | J-league<br>Kashima Antlers ×<br>Jubilo Iwata<br>in Kashima Stadium<br><br>25 min. of 2nd half<br>Kashima 3 - 1 Iwata<br>Kashima's corner kick<br>Kicker: Ogasawara<br>(8:15) | Professional Baseball<br>Giants × Tigers<br>in Tokyo Dome<br><br>bottom of<br>6th inning<br>Giants 4 - 7 Tigers<br>Pitcher: Yabu<br>Batter: Kiyohara<br>1 strike and 3 balls<br>(8:16) | USO? Japan<br><br>Encounter with alien<br>Tackey is surprised<br>(8:15) | } 50<br><br>} 60 |

| | NHK main | FTV | FCT | TUF |
|---|---|---|---|---|
| 20:00 | NHK News<br>▽ Today in Japan and the World<br>▽ Background of news | J-league<br>Kashima Antlers × Jubilo Iwata<br>in Kashima Stadium | Professional Baseball<br>Giants × Tigers<br>in Tokyo Dome | USO? Japan |

ELECTRONIC APPARATUS HAVING BROADCAST RECEIVING FUNCTION AND METHOD FOR DISPLAYING ELECTRONIC PROGRAM GUIDE THEREIN

BACKGROUND OF THE INVENTION

1. Field of the Invention

The present invention relates to an electronic apparatus having a broadcast receiving function and particularly to a method for displaying an electronic program guide in an electronic apparatus having a function of receiving television or radio broadcast.

2. Description of the Related Art

In television broadcast, such as BS broadcast and CS broadcast, electronic program guide information is combined with a television broadcast signal and an electronic program guide is displayed on a television screen based on the information. By referring to the electronic program guide, a user can search for a desired program among programs to be broadcast or check the contents of the program. Also, the user can set the recording of a program on a video recorder or the like based on the electronic program guide information.

In a television receiver, an electronic program guide as shown in FIG. 8 is displayed on the screen based on electronic program guide information. In FIG. 8, the time of broadcast is shown in the vertical axis, broadcast stations (channels) are shown in the horizontal axis, and the names of programs and summarized contents thereof are shown in the matrix. In FIG. 8, the name of program broadcasted by each broadcast station in a time slot of 20:00 is shown.

A method for presenting additional service information to such an electronic program guide is disclosed in Patent Document 1: PCT Japanese Translation Patent Publication No. 2002-532025, for example. In the method according to Patent Document 1, an advertisement window is added in a screen of the electronic program guide, or menu buttons including a sports button, a news button, and a hometown button are added in the screen of the electronic program guide. When a user presses these buttons, the television tuner is automatically tuned so that the user can obtain sports or news information.

However, the following problems exist in the known method for displaying an electronic program guide. In the electronic program guide shown in FIG. 8, the user can know only the summary of a program to be broadcasted of each channel. Therefore, the user cannot know which scene is currently being broadcasted in each channel and he/she has to check the contents of the program by switching channels. In other words, the known electronic program guide does not provide sufficient information for channel selection to the user. On the other hand, in the above-mentioned Patent Document, the user can select a desired program in the electronic program guide screen, but he/she cannot know the progress of a currently broadcasted program of each channel in this screen.

SUMMARY OF THE INVENTION

An object of the present invention is to solve the above-described problems of the known art and to provide an electronic apparatus having a broadcast receiving function for displaying an electronic program guide which allows a user to recognize the progress of a program of each channel and a method for displaying the electronic program guide in the apparatus.

According to an aspect of the present invention, an electronic apparatus having a broadcast receiving function includes a first obtaining unit for obtaining electronic program guide information about programs to be broadcast; a first storage unit for storing the electronic program guide information obtained by the first obtaining unit; a display unit; a second obtaining unit for obtaining progress information showing the progress of the programs which are being broadcast in a plurality of channels; a second storage unit for storing the progress information obtained by the second obtaining unit; and a display control unit for allowing the display unit to display the electronic program guide information stored in the first storage unit together with the progress information corresponding to the electronic program guide information by reading the progress information from the second storage unit.

Preferably, the electronic program guide information obtained by the first obtaining unit may be combined with a television broadcast signal or a radio broadcast signal. Alternatively, the first obtaining unit may obtain the electronic program guide information from an external data source through a network (e.g. the Internet).

Preferably, the progress information obtained by the second obtaining unit may be combined with a television broadcast signal or a radio broadcast signal. Alternatively, the second obtaining unit may obtain the progress information from an external data source through a network (e.g. the Internet).

The progress information is text data showing the progress of each program and the text data has a format which is standardized by MPEG (Moving Picture Expert Group)-7.

According to another aspect of the present invention, a method for displaying an electronic program guide in an electronic apparatus having a broadcast receiving function includes the following: obtaining electronic program guide information and storing the information in a memory; obtaining progress information showing the progress of programs which are being broadcast in a plurality of channels and storing the progress information in the memory; and displaying, on a display, the electronic program guide information stored in the memory together with the progress information of a corresponding program.

According to the present invention, progress information showing the progress of programs which are currently being broadcast in a plurality of channels is obtained, and electronic program guide information is displayed together with the corresponding progress information. Accordingly, the user can know a scene currently being broadcast of each program by seeing the display of the electronic program guide and can select a channel based on the information. With this configuration, a user-friendly electronic apparatus having enhanced usability can be provided.

BRIEF DESCRIPTION OF THE DRAWINGS

FIG. 5 is an example of displaying an electronic program guide of the embodiment;

FIG. 6 is another example of displaying an electronic program guide of the embodiment;

DESCRIPTION OF THE PREFERRED EMBODIMENTS

An electronic apparatus having a broadcast receiving function according to the present invention is preferably realized by a digital broadcast receiver for receiving digital television broadcast signals.

Figure 1:
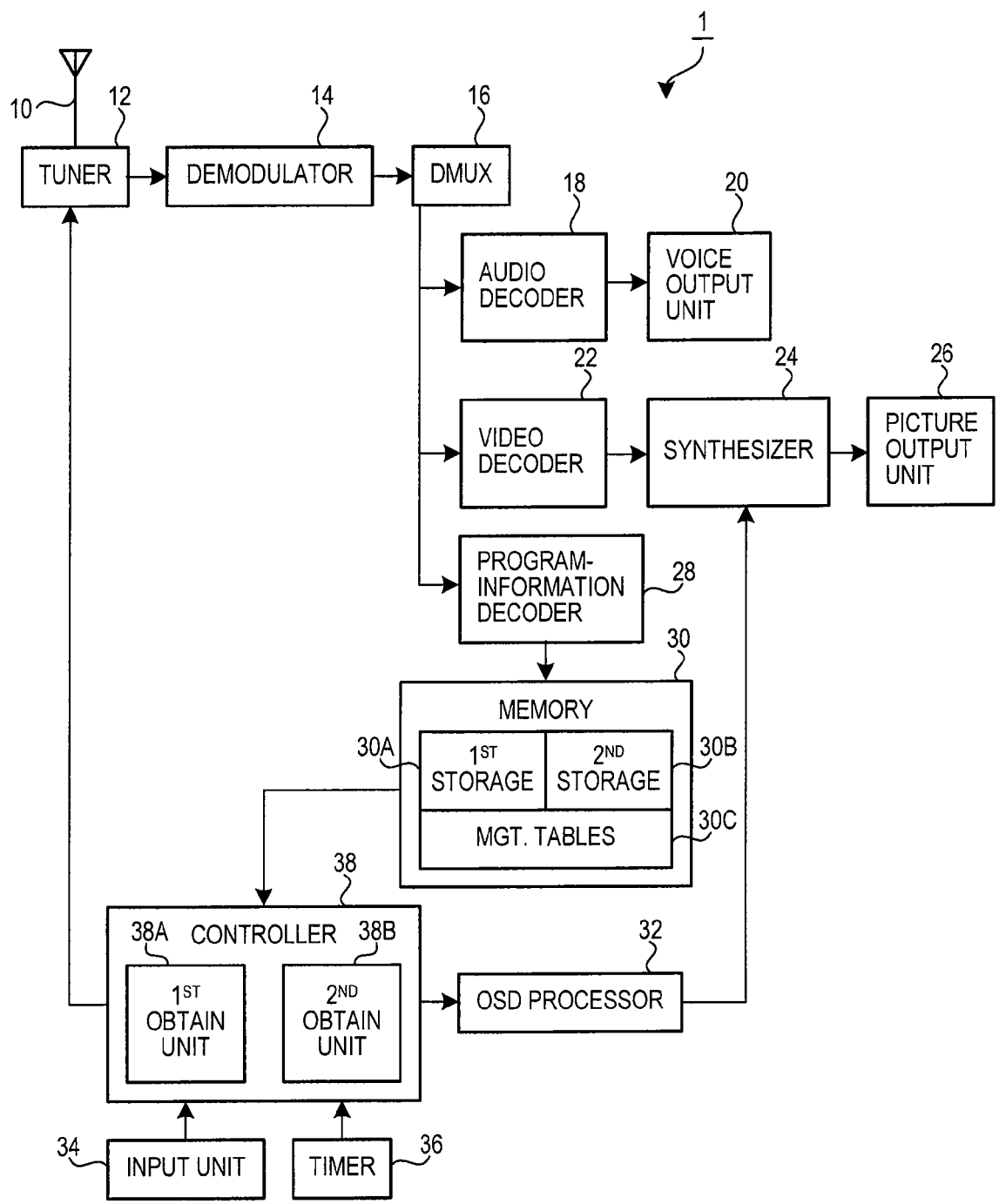
FIG. 1 is a block diagram showing the configuration of a digital broadcast receiver according to a first embodiment of the present invention.

FIG. 1 is a block diagram showing the configuration of a digital broadcast receiver 1 according to a first embodiment of the present invention. In FIG. 1, the digital broadcast receiver 1 includes an antenna 10 for receiving digital television broadcast signals and the like; a tuner 12 for selecting a radio wave of a predetermined channel from among the radio waves received by the antenna 10; a demodulator 14 for demodulating an output signal from the tuner 12 into a baseband signal and correcting errors; a demultiplexer (DMUX) 16 for demultiplexing a demodulated data-bit stream into an audio signal, a video signal, and program information; an audio decoder 18 for decoding a digital-compressed audio signal into an analog voice signal; a voice output unit 20 for amplifying the analog voice signal by an amplifier and producing the signal through a speaker; a video decoder 22 for decoding a digital-compressed video signal; a synthesizer 24 for synthesizing the video signal and data to be displayed on a television screen; and a picture output unit 26 for displaying the synthesized video signal on the television screen, such as a liquid crystal or plasma display.

Further, the digital broadcast receiver 1 includes a program-information decoder 28 for decoding the program information obtained in the demultiplexer 16; a memory 30 for storing the decoded program information; an on-screen display (OSD) processor 32 for creating data to be displayed on the television screen; an input unit 34 for requesting channel selection or display of the electronic program guide by the user; a timer 36 for managing time; and a controller 38 for controlling the above-mentioned components.

As will be described later, the program information includes electronic program guide information and progress information showing the progress of a program which is being broadcasted in each channel. The memory 30 stores the program information in a predetermined storage area under the control of the controller 38. Examples of the memory 30 include a rewritable semiconductor memory and a hard disk drive (HDD).

The controller 38 includes a first obtaining unit 38A for obtaining electronic program guide information and a second obtaining unit 38B for obtaining progress information showing the progress of programs which are being broadcast in a plurality of channels. The controller 38 preferably includes a ROM which stores a program for controlling the operation of the digital broadcast receiver 1, a central processing unit (CPU) for executing operation processing according to the program, and a RAM which stores various pieces of data operated by the CPU. The above-described memory 30 and the decoders are connected and controlled by a control signal (not shown) from the controller 38.

Preferably, the program information is transmitted from a broadcast station by being combined with a digital television broadcast signal. The program information includes an electronic program guide showing the programs to be broadcast and progress information showing the progress of programs which are being broadcast. The progress information includes the feature of a scene which is now on the air. For example, the progress information shows which news is broadcasted in a news program, who is at bat or what is the score in a baseball match, or who are talking to each other in a drama.

Such progress information is preferably text data which is described in accordance with a format standardized by MPEG-7, for example. The MPEG-7 defines the standard for describing contents of voice and picture information of various formats, and is aimed at the structural information of each element in voices, speeches, moving pictures, photographs, graphics, three-dimensional models, and scenes.

The progress information is created by a creator of contents, that is, a program producer in this case. Creating the progress information for every scene of a program is an excessive burden for the producer, and also a receiver has to receive a large amount of data. In order to reduce such burden, if the contents of a program are known in advance, such as in a drama, the progress information may be created for a timing of change of scenes. On the other hand, in live broadcasting, the progress information may be created at predetermined time intervals.

Such progress information is transmitted from each broadcast station by being combined with a digital broadcast signal, so that the receiver obtains the progress information of a program from each broadcast station. Accordingly, the user can recognize a currently broadcast scene of each program.

Figure 2:
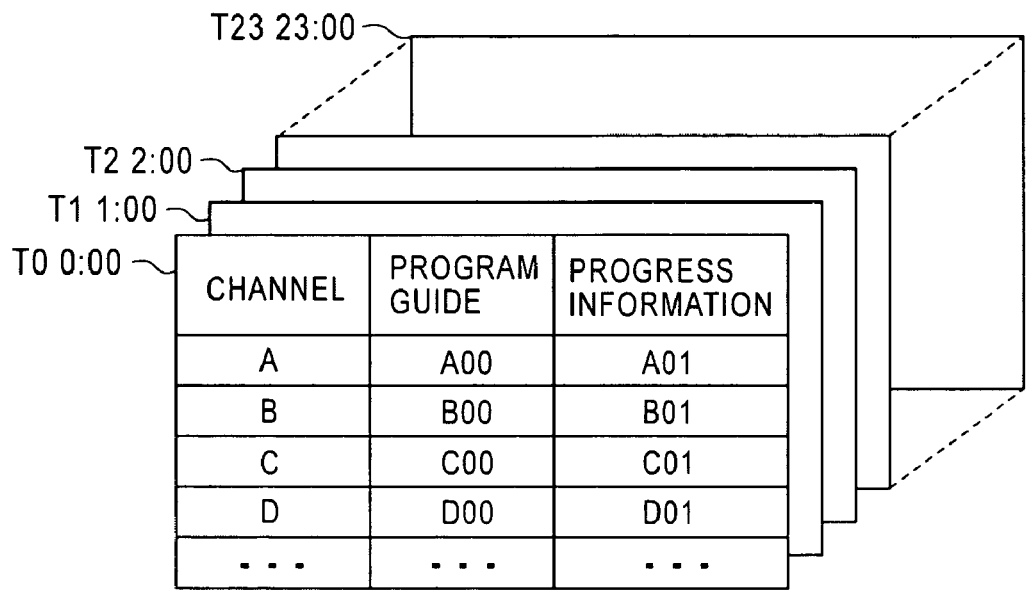
FIG. 2 shows the contents stored in a memory 30.

The memory 30 includes a first storage unit 30A for storing the electronic program guide information obtained by the first obtaining unit and a second storage unit 30B for storing the progress information obtained by the second obtaining unit. The memory 30 stores the program information decoded by the program-information decoder 28 in the manner shown in FIG. 2. The memory 30 stores management tables (30C) T0 to T23 for each time slot of one hour. Each table shows storage addresses of program information (program guide and progress information) corresponding to each channel (each broadcast station). For example, management table T0 manages the program information of each channel from 0:00 to 0:59, management table T1 manages the program information of each channel from 1:00 to 1:59, and management table T23 manages the program information from 23:00 to 23:59. This is the same for the other time slots.

In each management table, addresses of areas for storing a program guide and progress information are set for each channel. For example, in management table T0, the program guide of channel A is set at address A00, the progress information of channel A is set at address A01, the program guide of channel B is set at address B00, and the progress information of channel B is set at address B01. Likewise, the storage addresses of a program guide and progress information are set in management tables T1 to T23, and accordingly, the program information of at least 24 hours can be managed. The memory 30 includes a storage area for storing a program guide and progress information in addition to the area for the management tables.

The electronic program guide information and progress information are stored in the memory 30 under the control of the controller 38. When the receiver 1 can receive a television broadcast signal, the controller 38 refers to time information from the timer 36 and stores the program information, which has been obtained from a broadcast signal by decoding operation, in the address shown in the management table. For example, assume that the program information for channel A has been obtained and that the program information includes electronic program guide information of 8:00 to 10:00. In this case, the controller 38 searches management tables T8, T9, and T10 corresponding to the time slots of 8:00, 9:00, and 10:00, and stores the electronic program guide information in the addresses of program guides for channel A shown in these management tables.

For example, when the progress information of channel B is obtained by the tuner 12 at 20:00, the controller 38 searches management table T20 corresponding to 20:00, and stores the progress information in the address for channel B shown in management table T20.

Figure 3:
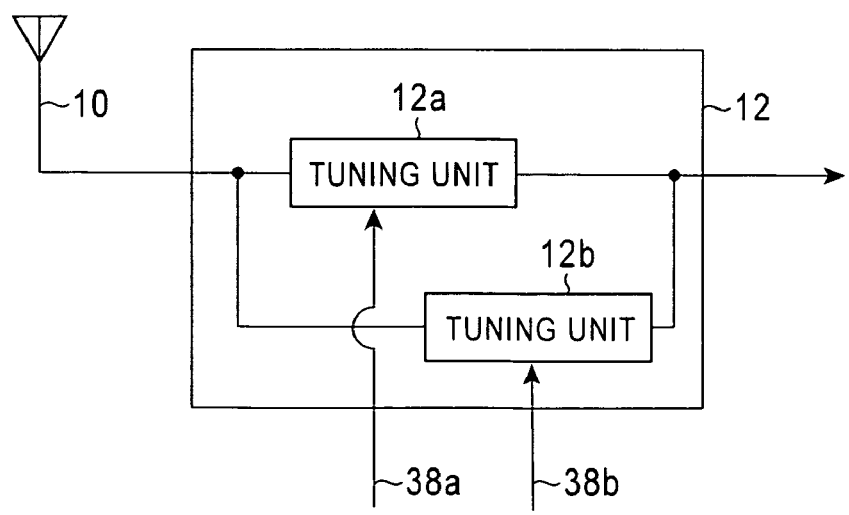
FIG. 3 shows an example of the configuration of a tuner.

When the user wants to change channels, he/she needs to obtain the progress information of channels other than the currently-selected channel. For this purpose, the controller 38 controls the tuner 12 so as to obtain the progress information and program guide information of other channels at a predetermined timing. At this time, in order to prevent the currently-received program from being affected, a commercial break may be detected so that the program information of other channels may be obtained during the commercial break. Alternatively, two tuning units 12a and 12b may be provided in the tuner 12 as shown in FIG. 3. The tuning unit 12a is allowed to tune in to the currently-received channel, and the tuning unit 12b is allowed to be tuned so as to obtain the program information of other channels. In this case, the controller 38 controls the tuning unit 12a through a control line 38a so as to receive a broadcast signal from a channel selected by the user and controls the tuning unit 12b through a control line 38b so as to receive a broadcast signal from other channels.

The OSD processor 32 creates data to be displayed on the television screen under the control of the controller 38. For example, when instructions for displaying an electronic program guide are provided from the input unit 34, the controller 38 reads the program guide and progress information stored in the memory 30, creates picture data so as to display them on the television screen, and sends the picture data to the synthesizer 24 which performs display control.

Figure 4:
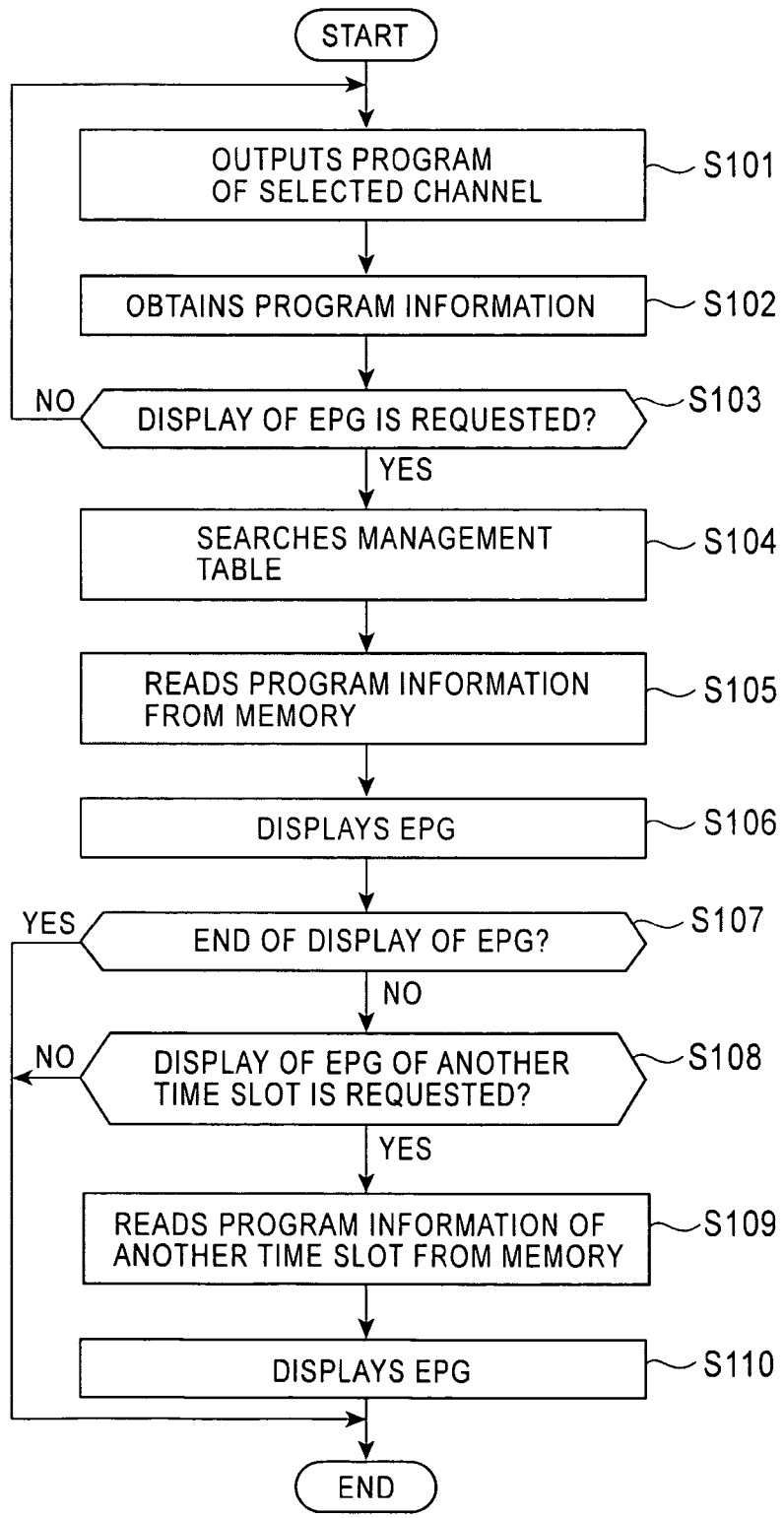
FIG. 4 is a flowchart showing an operation of displaying an electronic program guide in the digital broadcast receiver of the embodiment.

Next, a process of displaying an electronic program guide in the receiver 1 of this embodiment will be described with reference to the flowchart shown in FIG. 4. After the user has selected a channel through the input unit 34, the tuner 12 receives a television broadcast signal of the selected channel, and the program of this channel is produced from the voice output unit 20 and the picture output unit 26 (step S101).

The controller 38 obtains the program information of other channels in the above-described method while the program is being reproduced, and stores the program information in the memory 30 (step S102).

When display of the electronic program guide (EPG) is requested from the user (step S103), the controller 38 refers to the current time by using the timer 36, searches the management table of the time slot including the current time (step S104), and reads the program information (program guide and progress information) from the storage addresses shown in the corresponding management table (step S105).

Then, the controller 38 controls the OSD processor 32 so as to display the program information read from the memory 30 on the television screen (step S106).

FIG. 5 shows an example of displaying the electronic program guide of a time slot of 20:00. In the figure, an electronic program guide similar to the conventional one is displayed in a display area 50 in each channel (NHK main, FTV, FCT, and TUF). Further, progress information showing the progress of programs which are being broadcast is displayed in a display area 60 as text data. For example, in NHK main, it is shown that news about North Korea is being broadcasted. In FTV, the scores of Kashima and Iwata at 25 minutes in the second half are shown, and also it can be seen that a scene of corner kick is being broadcast. In this way, in the display area 60, the latest contents of a program which is being broadcast in the time slot of 20:00 are displayed in almost real time for each channel.

Referring back to FIG. 4, when instructions of ending display of the electronic program guide are provided from the user (step S107), the display is ended. If the user requests display of the electronic program guide of another time slot (step S108), the controller 38 searches the management table of a time slot of 1 hour before the current time, for example, reads program information according to the address described in the table, and displays the program information on the television screen (step S110). Steps S107 to S110 can be repeatedly performed according to a request from the user, so that the user can view the electronic program guide of a desired time slot.

As described above, the user can know a currently-broadcasted scene of each channel at a glance by seeing the progress information which is displayed together with the electronic program guide, and thus he/she need not change channels so as to check other program contents. Accordingly, the user can easily select an interesting channel by viewing the screen showing the electronic program guide.

FIG. 6 is another example of displaying an electronic program guide. In this example, the time when the progress information of each channel was obtained is also displayed. When the controller 38 stores the progress information in the memory 30, the controller 38 also stores time information obtained from the timer 36, so that the time information can be displayed together with the electronic program guide.

In FIGS. 5 and 6, the latest progress information is displayed in the electronic program guide. However, the present invention is not limited to this method, and all pieces of the progress information stored in the time slot may be displayed in time series.

Figures 7, 8:
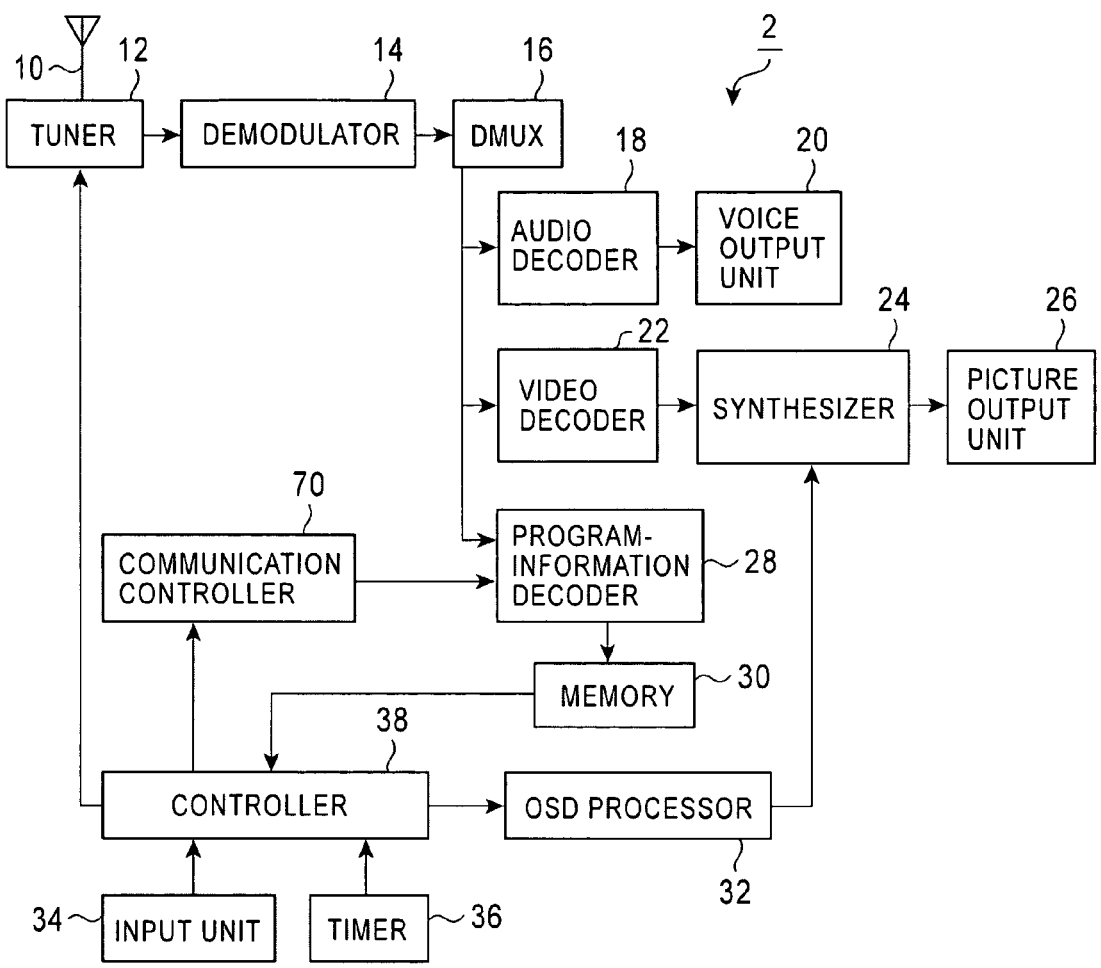
FIG. 7 is a block diagram showing the configuration of a digital broadcast receiver according to a second embodiment of the present invention.
FIG. 8 is an example of displaying a known electronic program guide.

FIG. 7 is a block diagram showing the configuration of a digital broadcast receiver 2 according to a second embodiment of the present invention. In the second embodiment, unlike in the first embodiment, the program information can be obtained from an external server through the Internet. The digital broadcast receiver 2 according to the second embodiment includes a communication controller 70 for accessing the Internet in a wired or wireless manner through a network such as a LAN. The communication controller 70 may download information about the contents of a program from a server of a broadcast station and store the information in the memory 30. For example, in a program of relaying a sports match, such as baseball, the progress of the match is uploaded to the server in real time, and thus the uploaded data can be obtained as progress information. Further, the electronic program guide may also be downloaded from a predetermined server and may be stored in the memory.

In the above-described embodiments, display of an electronic program guide for television broadcast is described as an example. However, the present invention may also be applied to display of an electronic program guide for radio broadcast. In that case, too, by providing progress information of a program together with an electronic program guide, the user can use the progress information in order to select a radio station.

The digital broadcast receiver according to the present invention is used in various electronic apparatuses and electronic systems including television receivers, AV receivers, and navigation systems, which have a receiving function of receiving digital broadcast signals using ground waves or satellite waves or digital broadcast signals of cable television. Such electronic apparatuses may either be fixed or mobile.

While the present invention has been described with reference to what is considered to be the preferred embodiments, it is to be understood that the invention is not limited to the disclosed embodiments. On the contrary, the invention is intended to cover various modifications and equivalent arrangements included within the spirit and scope of the appended claims.

What is claimed is:

1. An electronic apparatus for receiving a broadcast or a download, from a broadcast facility, the electronic apparatus comprising:
   a controller and memory operatively coupled to the controller, said controller and memory located in the electronic apparatus, said electronic apparatus located remote from the broadcast facility;
   a first obtaining unit in the controller for obtaining electronic program guide information about programs to be broadcast;
   a first storage unit in the memory for storing the electronic program guide information obtained by the first obtaining unit;
   a display unit;
   a second obtaining unit in the controller for obtaining progress information showing the latest contents of the programs which are being broadcast in a plurality of channels, the first obtaining unit separate from the second obtaining unit, wherein the second obtaining unit is configured to obtain the progress information from an external data source through a communication network;
   a second storage unit in the memory for storing the progress information obtained by the second obtaining unit, the second storage unit separate from the first storage unit;
   the memory including a plurality of management tables, wherein each management table includes:
      the electronic program guide information of the first storage unit corresponding to a one-hour period of time, for every channel of the plurality of channels, and
      the progress information of the second storage unit corresponding to a one-hour period of time, for every channel of the plurality of channels;
   the progress information corresponding to a pre-prepared description of the content of the respective program if the program is not live, and the progress information further including a last update time if the respective program is live;
   a control unit for directing the display unit to display the electronic program guide information stored in the first storage unit together with the progress information corresponding to the electronic program guide information by reading the progress information from the second storage unit; and
   first and second tuners configured to permit a user to view content corresponding to a first program and view the progress information corresponding to a second program without interrupting viewing of the first program.

2. An electronic apparatus according to claim 1, wherein the electronic program guide information obtained by the first obtaining unit is combined with a television broadcast signal.

3. An electronic apparatus according to claim 1, wherein the progress information obtained by the second obtaining unit is combined with a television broadcast signal.

4. An electronic apparatus according to claim 3, wherein the progress information showing the latest contents of the programs which are currently being broadcast in the plurality of channels is displayed in approximately real time for each channel.

5. An electronic apparatus according to claim 3, wherein the control unit directs the display unit to display the electronic program guide information and the progress information when receiving a request from a user.

6. An electronic apparatus according to claim 3, wherein the control unit directs the display unit to display the progress information of each program together with the time when the progress information was obtained.

7. An electronic apparatus according to claim 3, wherein the progress information is text data which describes the feature of pictures and voices in scenes of each program.

8. An electronic apparatus according to claim 7, wherein the text data has a format which is standardized by MPEG-7.

9. An electronic apparatus according to claim 7, wherein the text data has an HTML format.

10. An electronic apparatus according to claim 7, wherein the text data has an XML format.

11. An electronic apparatus according to claim 1, wherein the electronic program guide information obtained by the first obtaining unit is combined with a radio broadcast signal.

12. An electronic apparatus according to claim 11, wherein the progress information obtained by the second obtaining unit is combined with a radio broadcast signal.

13. An electronic apparatus according to claim 1, wherein the first obtaining unit obtains the electronic program guide information from an external data source through a network.

14. An electronic apparatus according to claim 13, wherein the second obtaining unit obtains the progress information from an external data source through a network.

15. A method for displaying an electronic program guide in an electronic apparatus for receiving a broadcast or a download, from a broadcast facility, the method comprising:
   providing a controller and memory operatively coupled to the controller, said controller and memory located in the electronic apparatus, said electronic apparatus located remote from the broadcast facility;
   obtaining electronic program guide information and storing the information in a first memory;
   obtaining progress information showing the latest contents of programs which are being broadcast in a plurality of channels and storing the progress information in a second memory, the first memory separate from the second memory, wherein the controller obtains the progress information from an external data source through a communication network;
   providing a plurality of management tables, wherein each management table includes:
      the electronic program guide information of the first memory corresponding to a one-hour period of time, for every channel of the plurality of channels, and
      the progress information of the second memory corresponding to a one-hour period of time, for every channel of the plurality of channels;
   the progress information corresponding to a pre-prepared description of the content of the respective programs if the program is not live, and the progress information further including a last update time if the respective program is live;
   displaying, on a display, the electronic program guide information stored in the first memory together with the progress information of a corresponding program stored in the second memory; and
   enabling a user to view content corresponding to a first program using a first tuner, and enabling the user to view progress information corresponding to a second program using a second tuner so as not to interrupt viewing of the first program.

16. A method according to claim 15, wherein the progress information showing the latest contents of each program included in the electronic program guide information is displayed in approximately real time.

17. A method according to claim 16, wherein the progress information is text data which describes the feature of pictures and voices in scenes of a drama.

18. A method according to claim 17, wherein the text data has a format which is standardized by MPEG-7.

19. A method according to claim 15, wherein the electronic program guide information and the progress information are obtained from a television broadcast signal or a radio broadcast signal.

20. A method according to claim 15, wherein the progress information is obtained from an external data source through a network.

21. A method according to claim 15, wherein the progress information is text data which describes the current play of a sporting event.

22. A method for indicating the current status of a program, the method comprising:
  providing a controller and memory operatively coupled to the controller, said controller and memory located in an electronic apparatus located remote from the broadcast facility;
  receiving by the electronic apparatus, an electronic program guide having information about a plurality of programs to be broadcast over a plurality of channels, the program guide received from a remotely located broadcast facility;
  storing the electronic program guide in a first portion of the memory;
  receiving progress information by the electronic apparatus, related to the progress of at least one of the programs currently being broadcast, the progress information corresponding to a pre-prepared description of the content of a respective program if the program is not live, and the progress information further including a last update time if the respective program is live;
  storing the progress information in a second portion of the memory, wherein the controller obtains the progress information for storage from an external data source through a communication network;
  providing a plurality of management tables, wherein each management table includes:
    the electronic program guide information of the first memory corresponding to a one-hour period of time, for every channel of the plurality of channels, and
    the progress information of the second memory corresponding to a one-hour period of time, for every channel of the plurality of channels;
  displaying at least a portion of the electronic program guide and the progress information wherein the current status of at least one of the programs is shown on a display; and
  enabling a user to view content corresponding to a first program using a first tuner, and enabling the user to view progress information corresponding to a second program using a second tuner so as not to interrupt viewing of the first program.

* * * * *